US008721444B2

(12) United States Patent
Mizutani et al.

(10) Patent No.: US 8,721,444 B2
(45) Date of Patent: May 13, 2014

(54) GAME DEVICE FOR PERFORMING OPERATION OBJECT CONTROL AND NON-OPERATION OBJECT CONTROL

(75) Inventors: Takashi Mizutani, Tokyo (JP); Yuji Yamada, Tokyo (JP); Tomoyuki Takahashi, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/382,041

(22) PCT Filed: Mar. 15, 2010

(86) PCT No.: PCT/JP2010/001827
§ 371 (c)(1),
(2), (4) Date: Mar. 2, 2012

(87) PCT Pub. No.: WO2011/010414
PCT Pub. Date: Jan. 27, 2011

(65) Prior Publication Data
US 2012/0157201 A1    Jun. 21, 2012

(30) Foreign Application Priority Data

Jul. 21, 2009  (JP) ................................ 2009-170157
Jul. 21, 2009  (JP) ................................ 2009-170158

(51) Int. Cl.
*A63F 13/00* (2014.01)
*A63F 13/10* (2006.01)
*G06T 19/00* (2011.01)

(52) U.S. Cl.
CPC ...................................... *A63F 13/10* (2013.01)
USPC .................... 463/37; 463/6; 463/36; 345/419

(58) Field of Classification Search
CPC ..... A63F 13/00; A63F 13/10; A63F 2300/64; A63F 2300/643
USPC ................. 463/6, 30–33, 36–37, 39; 345/419
See application file for complete search history.

(56) References Cited

U.S. PATENT DOCUMENTS 5,755,620 A * 5/1998 Yamamoto et al. ............. 463/34
8,000,924 B2 * 8/2011 Sato et al. ..................... 702/153
(Continued)

FOREIGN PATENT DOCUMENTS

JP          850661 A    2/1996
JP      2002140705 A    5/2002
(Continued)

OTHER PUBLICATIONS

VanHalenMedia, Call of Duty 4 Modern Warfare—All 30 Enemy Intel Locations HD PVR, Jun. 21, 2009, http://www.youtube.com/watch?v=rw2usis3vLg.*

(Continued)

*Primary Examiner* — Dmitry Suhol
*Assistant Examiner* — Jason Yen
(74) *Attorney, Agent, or Firm* — Matthew B. Dernier, Esq.; Gibson & Dernier LLP

(57) ABSTRACT

A frame image acquiring unit acquires a captured image of an input device that is provided with an illuminator. A device information deriving unit derives position information of the input device from the captured image. An input receiving unit acquires attitude information of the input device. An operation object control unit controls the motion of an operation object in accordance with the position information and the attitude information of the input device. A non-operation object control unit controls the motion of a non-operation object. A collision control unit determines the motion of at least one of the operation object and the non-operation object in accordance with a collision mode for the collision between the operation object and the non-operation object.

8 Claims, 12 Drawing Sheets

(56) References Cited

U.S. PATENT DOCUMENTS

| | | | |
|---|---|---|---|
| 8,368,753 B2* | 2/2013 | Zalewski | 348/142 |
| 2005/0024379 A1 | 2/2005 | Marks | |
| 2005/0026689 A1 | 2/2005 | Marks | |
| 2005/0272506 A1* | 12/2005 | Sumi | 463/51 |
| 2006/0022974 A1* | 2/2006 | Yamamoto et al. | 345/419 |
| 2006/0258445 A1* | 11/2006 | Nishimori et al. | 463/30 |
| 2006/0287082 A1 | 12/2006 | Madigou | |
| 2007/0072674 A1* | 3/2007 | Ohta et al. | 463/37 |
| 2008/0261693 A1* | 10/2008 | Zalewski | 463/31 |
| 2009/0082077 A1* | 3/2009 | Sugimori et al. | 463/6 |
| 2010/0093435 A1* | 4/2010 | Glaser et al. | 463/36 |
| 2010/0105475 A1* | 4/2010 | Mikhailov et al. | 463/33 |
| 2010/0144436 A1* | 6/2010 | Marks et al. | 463/36 |
| 2010/0160016 A1* | 6/2010 | Shimabukuro et al. | 463/16 |
| 2010/0285883 A1* | 11/2010 | Zalewski | 463/39 |

FOREIGN PATENT DOCUMENTS

| | | | | |
|---|---|---|---|---|
| JP | 2003208263 A | | | 7/2003 |
| JP | 2006510424 A | | | 3/2006 |
| JP | 2006318136 A | | | 11/2006 |
| JP | 2007289529 A | * | | 11/2007 |
| JP | 2008000345 A | * | | 1/2008 |
| JP | 2008040800 A | * | | 2/2008 |

OTHER PUBLICATIONS

International Search Report for corresponding PCT application PCT/JP2010/001827, dated May 25, 2010.

International Preliminary Report on Patentability for corresponding PCT application PCT/JP2010/001827, dated Feb. 7, 2012.

Office Action issued for corresponding Japanese Patent Application No. 2009-170158, dated Sep. 3, 2013.

* cited by examiner

FIG.1
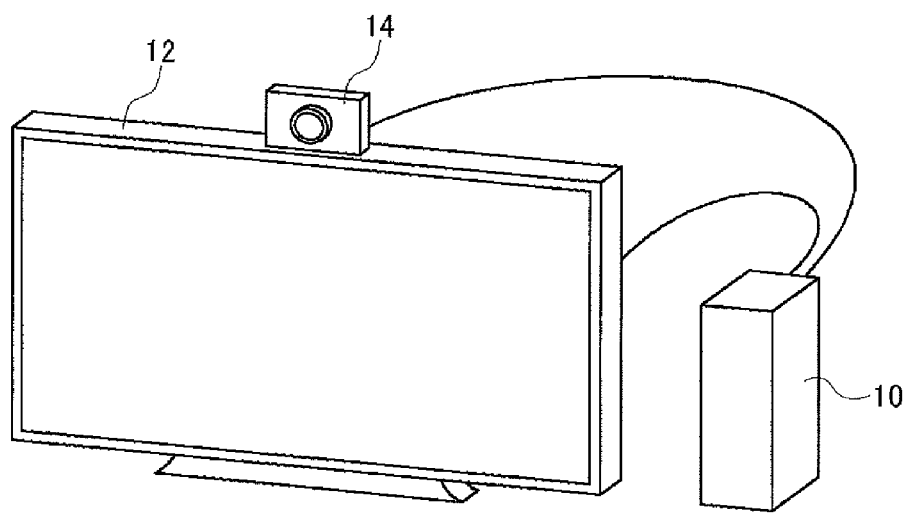
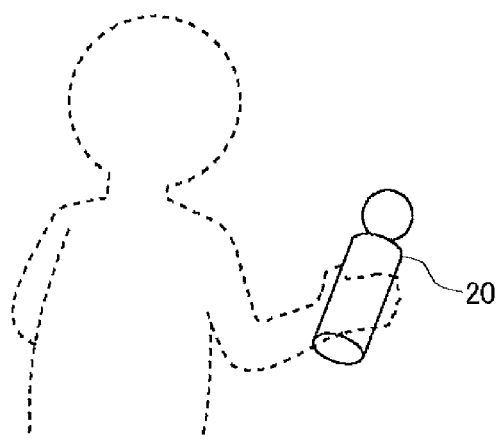

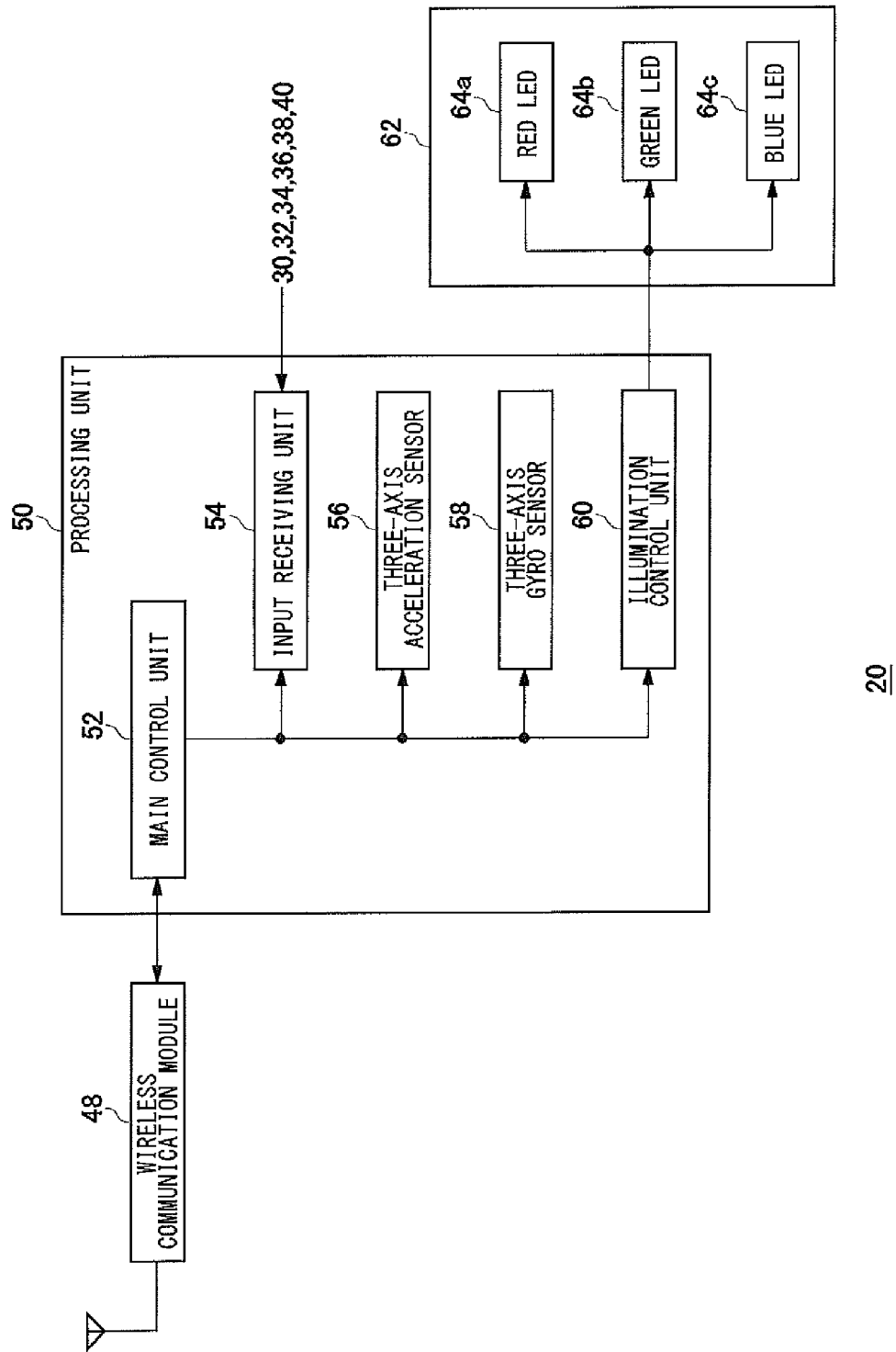

FIG.7
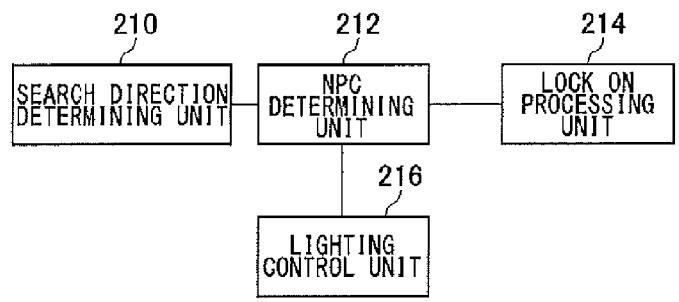
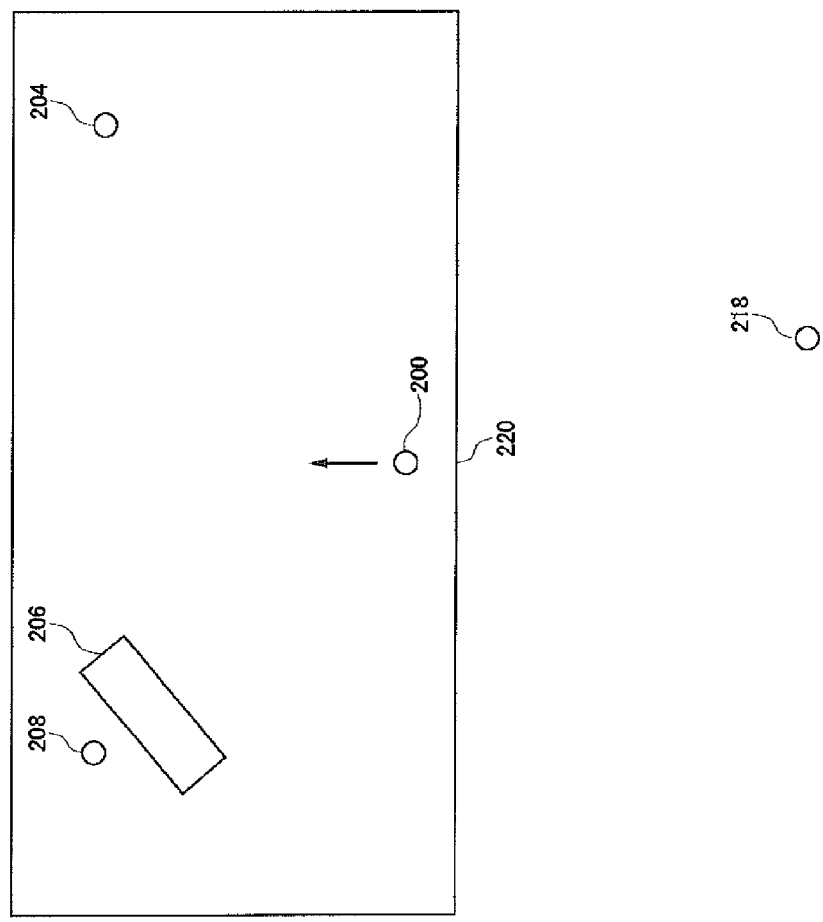
FIG.8

240
12

12

12

GAME DEVICE FOR PERFORMING OPERATION OBJECT CONTROL AND NON-OPERATION OBJECT CONTROL

TECHNICAL FIELD

The present invention relates to technology for game control, and more particularly, to game devices for allowing a user to use an input device so as to move a game character.

BACKGROUND ART

Along with the improvement in processing capability of game devices, a number of games have come on the market wherein a player character and a non-player character are moved in a game field modeled three-dimensionally. Recently, wireless type game controllers become widely available as input devices for games. Further, a technology has been proposed, which utilizes as an input for games, not only conventional button manipulation, but also the movement of an object moved by a user in an image captured by a camera.

RELATED ART LIST

[PATENT DOCUMENT NO. 1] JP 2002-140705

Input devices have tight relationships with games. When a new input device makes its debut, a game application that takes advantage of the feature of the input device is developed. The present inventor has attained an idea on a new game application that operates in conjunction with an input device moved by a user so as to satisfy diversified requirements of users.

SUMMARY OF THE INVENTION

In this background, a purpose of the present invention is to provide a technology for allowing the motion of an object in a game to reflect the movement of an input device made by a user.

In order to solve the problem, an aspect of the present invention provides a game device. The game device includes: an image acquiring unit operative to acquire a captured image of an input device that is provided with an illuminator; a device information deriving unit operative to derive position information of the input device from the captured image; a receiving unit operative to acquire attitude information of the input device; an operation object control unit operative to control the motion of an operation object in accordance with the position information and the attitude information of the input device; a non-operation object control unit operative to control the motion of a non-operation object; an image generating unit operative to generate a display screen image in accordance with the motion of the operation object and the motion of the non-operation object; and a collision control unit operative to detect a collision between the operation object and the non-operation object. The collision control unit determines the motion of at least one of the operation object and the non-operation object in accordance with a collision mode for the collision between the operation object and the non-operation object.

According to another aspect of the present invention, also a game device is provided. The game device includes: a receiving unit operative to acquire attitude information of an input device that is provided with an illuminator; an operation object control unit operative to control the motion of an operation object in a virtual space; a non-operation object control unit operative to control the motion of a non-operation object in the virtual space; a searching direction determining unit operative to determine a direction for searching for a non-operation object based on the position of the operation object and attitude information of the input device; a determining unit operative to determine whether a non-operation object exists in the searching direction; and a lighting control unit operative to control the lighting of the illuminator if the determining unit determines that a non-operation object exists.

Optional combinations of the aforementioned constituting elements, and implementations of the invention in the form of methods, apparatuses, systems, recording media, computer programs, or the like may also be practiced as additional modes of the present invention.

According to the present invention, a technology for allowing the movement of an object in a game to reflect the movement of an input device made by a user can be provided.

BRIEF DESCRIPTION OF THE DRAWINGS

FIG. 1 shows an environment in which a game system according to an exemplary embodiment of the present invention is used;

FIG. 3 shows an internal structure of the input device;

FIG. 7 shows a structure of a search control unit;

FIG. 8 is a diagram for illustrating a non-player character detecting function of the NPC determining unit;

DETAILED DESCRIPTION OF THE INVENTION

Figure 2A:
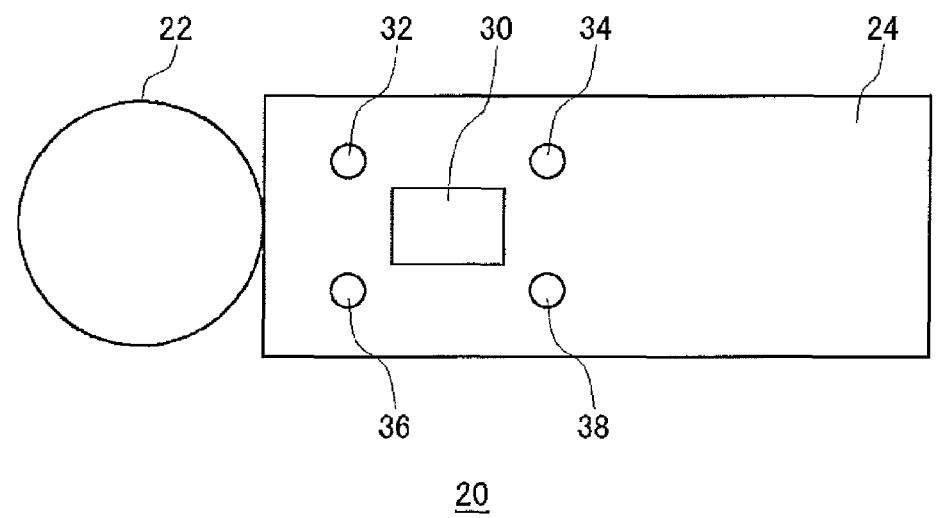
FIGS. 2A and 2B show external views of the structure of an input device.

According to an exemplary embodiment, a game device is provided. The game device is able to acquire position information and/or attitude information of an input device in a real space, which functions as a game controller, and is able to execute game software based on the acquired information.

FIG. 1 shows an environment in which a game system 1 according to an exemplary embodiment of the present invention is used. The game system 1 comprises a game device 10 that executes game software, a display device 12 that outputs the result of processing by the game device 10, an input device 20, and an imaging device 14 that takes an image of the input device 20.

The input device 20 is an operation input device for allowing a user to instruct operations. The game device 10 is a processing device that processes a game application based on the operation instruction input through the input device 20 and generates an image signal indicating the results of the processing of the game application.

The input device 20 has a function for transmitting an operation instruction input by a user to the game device 10, and is configured as a wireless controller that can communicate with the game device 10 wirelessly according to the exemplary embodiment. A wireless communication may be established between the input device 20 and the game device 10 by using Bluetooth (registered trademark) protocol. The input device 20 is not limited to a wireless controller, but may also be a wired controller connected with the game device 10 via cable.

The input device 20 is driven by a battery and is configured to provide a plurality of buttons for instructing operations for letting a game proceed. A user manipulates a button of the input device 20, and the operation instruction is wirelessly transmitted to the game device 10, accordingly. The game device 10 receives the operation instruction from the input device 20, controls the progress of the game in accordance with the operation instruction, and generates a game image signal. The generated game image signal is output from the display device 12.

The imaging device 14 is a video camera configured with a CCD image pickup device, a CMOS image pickup device, or the like, and captures images of a real space at a predetermined time intervals, and generates a frame image for each time interval. For example, the capturing rate of the imaging device 14 may be set as 30 frames per second so as to agree with the frame rate of the display device 12. The imaging device 14 is connected with the game device 10 via a USB (Universal Serial Bus) or other interface.

The display device 12 is a display for outputting an image. The display device 12 receives an image signal generated in the game device 10 and displays a game screen. The display device 12 may be a television provided with a display and a speaker, or may be a computer display. The display device 12 may be connected to the game device 10 by cable or may be wirelessly connected using a wireless LAN (Local Area Network), or the like.

In the game system 1 according to the exemplary embodiment, the input device 20 is provided with an illuminator. During a game, the illuminator emits light in a predetermined color and the image thereof is captured by the imaging device 14. The imaging device 14 takes an image of the input device 20, generates a frame image, and provides the image to the game device 10, accordingly. The game device 10 acquires the frame image and derives position information of the illuminator in the real space based on the position and the size of the image of the illuminator in the frame image. The game device 10 handles the position information as an instruction for operating the game and allows the information to be reflected in the processing of the game, for example, in controlling the movement of a player character, etc. The game device 10 according to the exemplary embodiment is provided with a function for processing a game application by using not only input operation via the button of the input device 20, but also the position information of the acquired image of the illuminator.

The illuminator of the input device 20 is structured so as to be able to emit light in a plurality of colors. The illuminator is able to change the color of its light by an illumination instruction from the game device 10.

The input device 20 is provided with an acceleration sensor and a gyro sensor. A detection value of the sensors are transmitted to the game device 10 in a predetermined time intervals, and the game device 10 acquires the detection value of the sensors and acquires attitude information of the input device 20 in a real space. The game device 10 handles the attitude information as an instruction for operating the game and allows the information to be reflected in the processing of the game. In this manner, the game device 10 is provided with a function for processing a game application by also using the acquired information on the attitude of the input device 20.

Figure 2B:
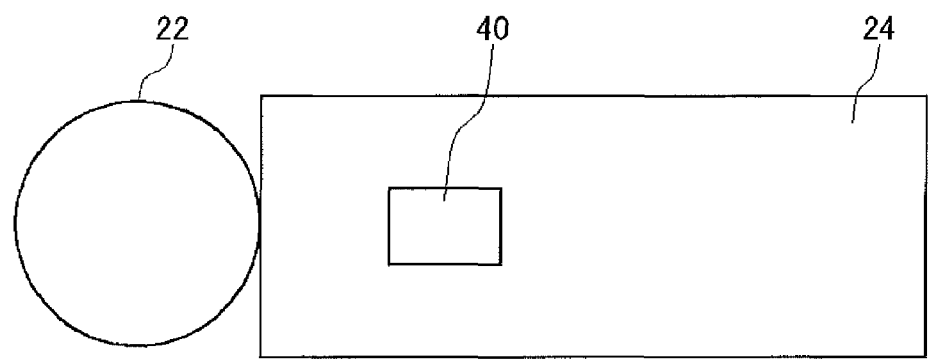

FIGS. 2A and 2B show external views of the structure of an input device 20. FIG. 2A shows an upper side structure of the input device 20 and FIG. 2B shows an underside structure of the input device 20. The input device 20 is provided with an illuminator 22 and a handle 24. The outside of the illuminator 22 is formed in a spherical body of a resin having an optical transparency. Inside of the illuminator 22, is provided with a light emitting element, such as a light emitting diode, an electrical bulb, or the like. The inner light emitting element produces luminescence, and the entire external spherical body glows, accordingly. On the upper surface of the handle 24, manipulation buttons 30, 32, 34, 36, and 38 are provided. On the under surface, a manipulation button 40 is provided. A user manipulates the manipulation buttons 30, 32, 34, 36, and 38 by his/her thumb and the manipulation button 40 with his/her forefinger while holding the end of the handle 24. The manipulation buttons 30, 32, 34, 36, and 38 are configured as push-down type buttons and a user manipulates the buttons by pressing them. The manipulation button 40 may be a button with which an analogue value can be input.

A user plays a game while watching a game screen displayed on the display device 12. Since the imaging device 14 is required to capture the image of the illuminator 22 during the execution of a game application, the imaging device 14 is preferably arranged so that the field of view thereof is directed to the same direction with the display device 12. Generally, users play games often in front of the display device 12, the imaging device 14 is arranged so that the optical axis thereof agrees with the frontal direction of the display device 12. More specifically, the imaging device 14 is preferably arranged near the display device 12 so as to include a position where a user can watch a screen displayed on the display device 12 into the field of view of the imaging device 14. Thereby the imaging device 14 can capture the image of the input device 20.

FIG. 3 shows an internal structure of the input device 20. The input device 20 comprises a wireless communication module 48, a processing unit 50, an illumination unit 62 and manipulation buttons 30, 32, 34, 36, 38, and 40. The wireless communication module 48 is provided with a function for transmitting and receiving data to and from a wireless communication module of the game device 10. The processing unit 50 executes a desired process in the input device 20.

The processing unit 50 is provided with a main control unit 52, an input receiving unit 54, a three-axis acceleration sensor 56, a three-axis gyro sensor 58 and an illumination control unit 60. The main control unit 52 sends and receives necessary data to and from the wireless communication module 48.

The input receiving unit 54 receives input information from the manipulation buttons 30, 32, 34, 36, 38, and 40, and sends the information to the main control unit 52, accordingly. The three-axis acceleration sensor 56 detects acceleration components of three-axis directions, X, Y, and Z, respectively. The three-axis gyro sensor 58 detects an angular velocity in each of the XZ plane, ZY plane, and YX plane. In this exemplary embodiment, the width direction of the input device 20 is defined as the x-axis, the height direction thereof is defined as the y-axis, and the longitudinal direction thereof is defined as the z-axis. The three-axis acceleration sensor 56 and the three-axis gyro sensor 58 are arranged in the handle 24 of the input device 20, preferably arranged in the vicinity of the center in the handle 24. The wireless communication module 48 transmits to the wireless communication module of the game device 10 in a predetermined time intervals, detection value information from the three-axis acceleration sensor 56 and detection value information from the three-axis gyro sensor 58 together with input information from the manipulation buttons. The time interval for transmitting is, for example, determined to be 11.25 m sec.

The illumination control unit 60 controls the emission of light from the illumination unit 62. The illumination unit 62 is provided with a red LED 64a, a green LED 64b, and a blue LED 64c, and makes possible the emission of lights in a plurality of colors. The illumination control unit 60 adjusts the emission of light of the red LED 64a, the green LED 64b, and the blue LED 64c so as to allow the illumination unit 62 to emit light in a desired color.

Upon receiving an instruction for emitting light from the game device 10, the wireless communication module 48 provides the main control unit 52 with the instruction, and the main control unit 52 provides the illumination control unit 60 with the instruction for emitting light, accordingly. The illumination control unit 60 controls the emission of light of the red LED 64a, the green LED 64b, and the blue LED 64c so that the illumination unit 62 emits light in the color specified by the instruction for emitting light. For example, the illumination control unit 60 may control the lighting of respective LEDs by a PWM (pulse width modulation) control.

Figure 4:
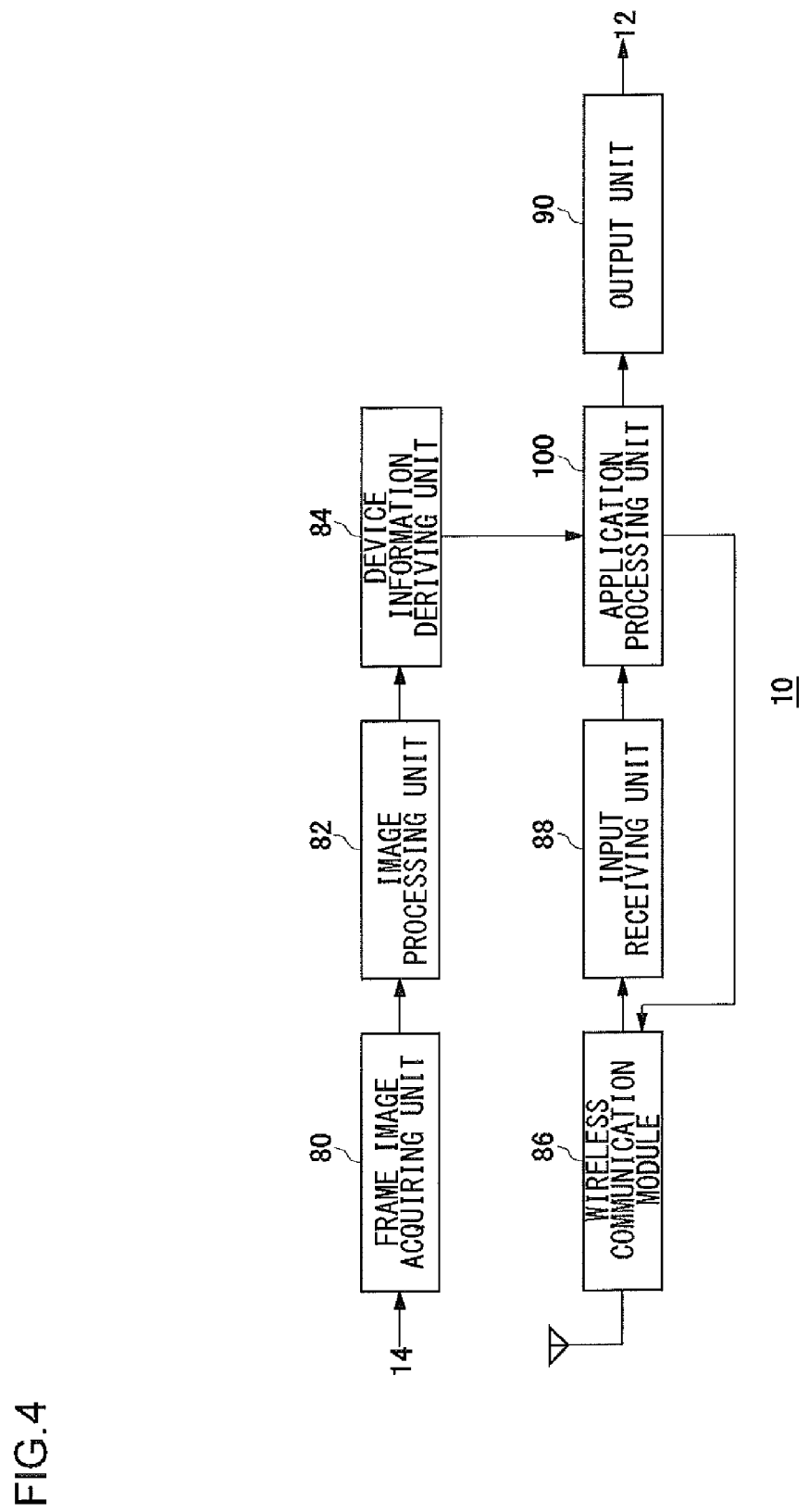
FIG. 4 shows a structure of a game device.

FIG. 4 shows a structure of the game device 10. The game device 10 comprises a frame image acquiring unit 80, an image processing unit 82, a device information deriving unit 84, a wireless communication module 86, an input receiving unit 88, an output unit 90, and an application processing unit 100. The processing function of the game device 10 according to the exemplary embodiment may be implemented by elements such as a CPU, a memory, a computer program loaded into a memory, or the like. FIG. 4 depicts functional blocks implemented by the cooperation of the elements. The program may be built in the game device 10 or supplied from an external source in the form of a recording medium. Therefore, it will be obvious to those skilled in the art that the functional blocks may be implemented in a variety of manners by a combination of hardware and software. The game device 10 may be provided with a plurality of CPUs, depending on the hardware configuration.

The wireless communication module 86 establishes wireless communication with the wireless communication module 48 of the input device 20. Thereby, the input device 20 is able to transmit status information on the manipulation buttons, the detection value information of the three-axis acceleration sensor 56 and the three-axis gyro sensor 58 to the game device 10 at predetermined time intervals.

The wireless communication module 86 receives the status information on the manipulation buttons, and the sensor detection value information transmitted from the input device 20 and provides the input receiving unit 88 with the information. The input receiving unit 88 divides the button status information and the sensor detection value information, and passes the information over to the application processing unit 100. The application processing unit 100 receives the button status information and the sensor detection value information as operation instructions on the game. The application processing unit 100 handles the sensor detection value information as the attitude information of the input device 20.

The frame image acquiring unit 80 is configured as a USB interface and acquires frame images from the imaging device 14 at a predetermined image capturing rate (e.g., 30 frames per second). The image processing unit 82 extracts an image of the illuminator from the frame image. The image processing unit 82 specifies the position and the size of the image of the illuminator in the frame image. By allowing the illuminator 22 of the input device 20 to emit light in a specific color, for example a color which are unlikely to be used in a user environment, the image processing unit 82 can extracts the image of the illuminator from the frame image at a high accuracy. The image processing unit 82 may perform a digitization process on the frame image data by using a predetermined threshold value and may generate a digitized image. By this digitization process, the pixel value of a pixel having a luminance larger than the threshold value is encoded to "1" and the pixel value of a pixel having a luminance smaller than or equal to the threshold value is encoded to "0". By allowing the illuminator 22 to emit light at luminance more than the threshold value, the image processing unit 82 can specify the position and the size of the image of the illuminator from the digitized image. For example, the image processing unit 82 specifies the center of gravity coordinates and the radius of the image of the illuminator in the frame image.

The device information deriving unit 84 derives the position information of the input device 20 observed from the imaging device 14 based on the position and the size of the image of the illuminator specified by the image processing unit 82. The device information deriving unit 84 derives the position coordinates in a camera coordinate system based on the center of gravity coordinates of the illuminator image, and derives information on the distance from the imaging device 14 based on the radius of the illuminator image. The position coordinates and the distance information constitute the position information of the input device 20. The device information deriving unit 84 derives the position information of the input device 20 for each of the frame images and passes the position information over to the application processing unit 100. The application processing unit 100 receives the position information of the input device 20 as an operation instruction on the game.

Based on the position information and the attitude information of the input device 20, and the button status information, the application processing unit 100 allows the game to proceed, and generates an image signal indicating the result of the processing of the game application. The image signal is sent from the output unit 90 to the display device 12, and is output as a display image.

Figure 5:
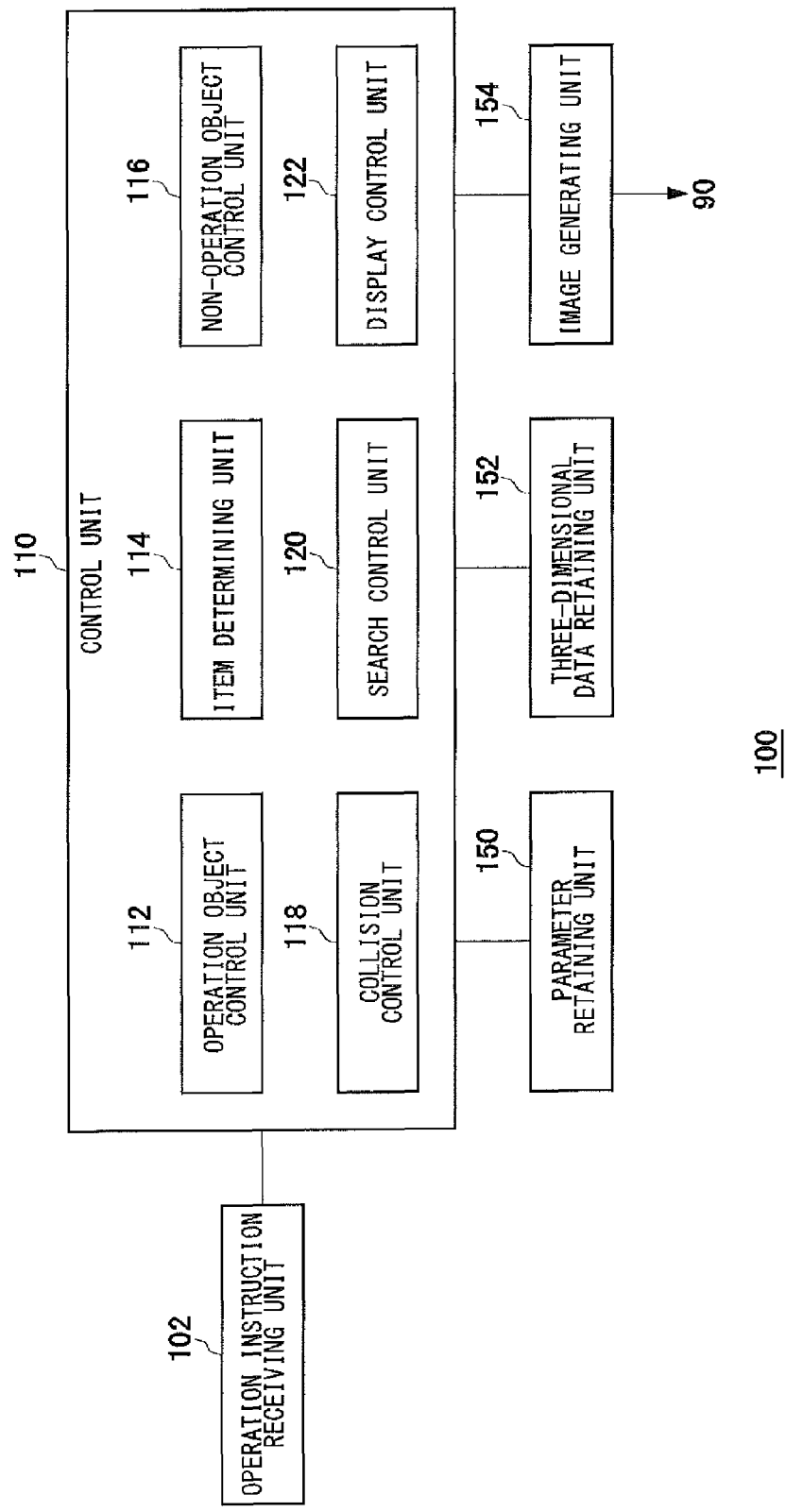
FIG. 5 shows a structure of an application processing unit.

FIG. 5 shows a structure of an application processing unit 100. The application processing unit 100 comprises an operation instruction receiving unit 102, a control unit 110, a parameter retaining unit 150, a three-dimensional data retaining unit 152 and an image generating unit 154.

The operation instruction receiving unit 102 receives the position information of the input device 20 from the device information deriving unit 84, and the attitude information of the input device 20 and the button status information from the input receiving unit 88, respectively as operation instructions. The control unit 110 executes a game program based on the operation instructions received by the operation instruction receiving unit 102, and allows the game to proceed. The parameter retaining unit 150 retains necessary parameters for the progress of the game. The three-dimensional data retaining unit 152 retains three-dimensional data, such as an object or the like constituting a game world. The image generating unit 154 defines the view point position and the line of sight direction of the camera in the game space, renders three-dimensional data, and generates a display screen image representing the game world controlled by the control unit 110, i.e., a display screen image in accordance with the motion of an operation object and the motion of a non-operation object.

The control unit 110 includes an operation object control unit 112, an item determining unit 114, a non-operation object control unit 116, a collision control unit 118, a search control unit 120 and a display control unit 122.

The operation object control unit 112 controls the motion of an operation object in accordance with the operation instruction received by the operation instruction receiving unit 102. The operation object is an object that can be operated by a user, and typically includes a player character. In this exemplary embodiment, an item that the player character uses is also included in the operation objects. The item determining unit 114 determines an item that the player character uses, in accordance with the button status information from a user. As will be described later, a search radar, a capturing equipment, a bashing weapon, a throwing weapon, or the like, are provided as items that a player character uses.

The non-operation object control unit 116 controls the motion of the non-operation object. The non-operation object is an object that the user does not operate, and typically includes a non-player character.

In a game executed by the game device 10 according to the exemplary embodiment, a player character that the user operates searches for a non-operation object, existing in a game world created by the three dimensional modeling, while using one of the items, the search radar. Upon finding a non-operation object, the player character locks on the non-operation object and chases the object, accordingly. Upon being pursued by the player character, the motion of the non-operation object is controlled so that the non-operation object escapes. If the player character comes close to the non-operation object, the player character hits the non-operation object by using the bashing weapon, or traps the non-operation object by using the capturing equipment. Further, the player character can give damage the non-operation object by using the throwing weapon.

The collision control unit 118 performs a collision determination between an operation object and a non-operation object in the game space. The collision determination is performed at various game scenes, such as, a scene in which the player character hits a non-operation object by using the bashing weapon, a scene in which the player character captures a non-operation object by using the capturing equipment, a scene in which the player character throws the throwing weapon to a non-operation object, etc.

The search control unit 120 determines whether or not a non-operation object exists in the searching direction in the game space. This searching process is performed in case a player character searches for a non-operation object by using the search radar. The display control unit 122 controls the camera for rendering a three-dimensional game world in accordance with the displacement of the player character, and allows the image generating unit 154 to generate a display screen image. An explanation on the detailed operation of respective elements will be given below.

The user presses the manipulation button 34 of the input device 20, and the input receiving unit 54 receives the operation instruction, accordingly. Then the wireless communication module 48 transmits the instruction to the game device 10 as button status information. In the game device 10, the wireless communication module 86 receives the button status information, and the input receiving unit 88 provides the information to the application processing unit 100. In the application processing unit 100, the operation instruction receiving unit 102 receives the manipulation of pressing the manipulation button 34 as an operation instruction for a searching process. The item determining unit 114 determines the search radar as an item to be used by the player character based on the button status information indicating that the manipulation button 34 is pressed.

Figure 6:
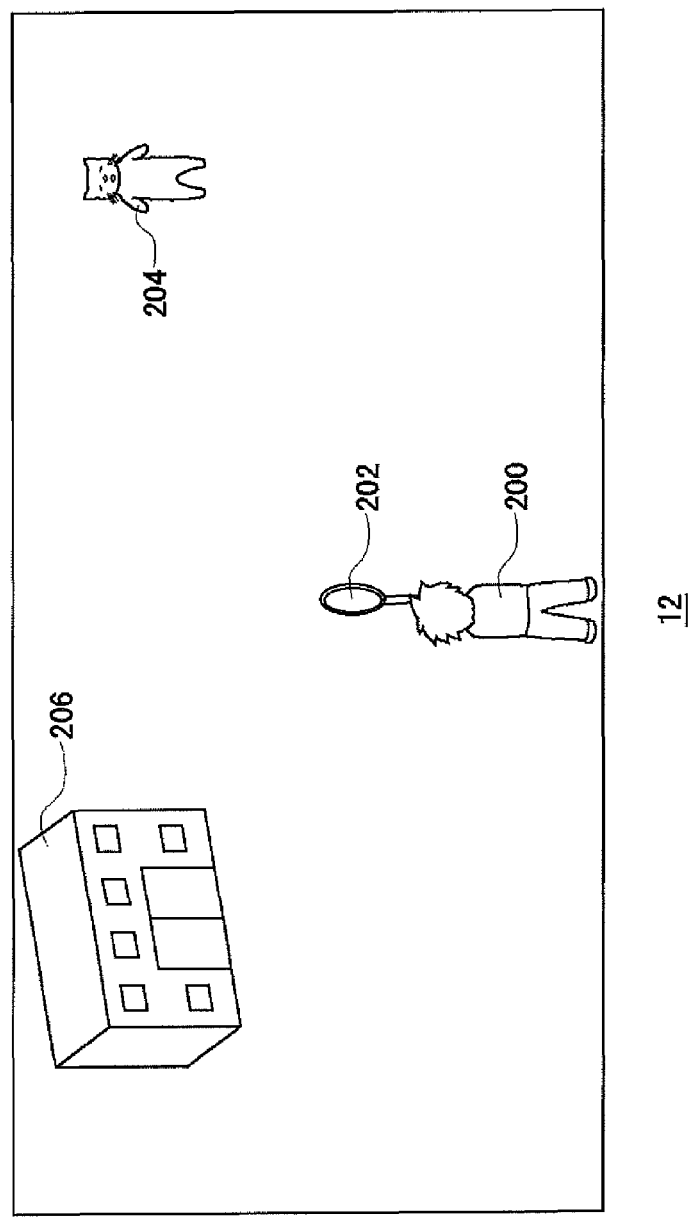
FIG. 6 shows an exemplary display screen image while a search radar is used.

FIG. 6 shows an exemplary display screen image while the search radar is used. On the display screen image, a player character 200, a search radar 202, a non-player character 204 and an obstacle 206 are displayed. The player character 200 and the search radar 202 are operation objects that a user can operate, and the non-player character 204 is a non-operation object that a user can not operate. In the game space, the non-player character 204 is operated by the non-operation object control unit 116. The obstacle 206 is a still non-operation object, and the position thereof in the three-dimensional space is determined by data retained in the three-dimensional data retaining unit 152. The display control unit 122 determines the direction of the line of sight and the position of the view point of the virtual camera in the game space represented by world coordinates in accordance with the moving direction or the moving distance of the player character 200 in response to an operation instruction input by a user. The image generating unit 154 arranges the virtual camera at the determined position of the viewpoint and directs the optical axis of the virtual camera to the determined direction of the line of sight, renders three-dimensional data retained in the three-dimensional data retaining unit 152, and generates a display screen image in accordance with the motion of the operation object and the motion of the non-operation object.

FIG. 7 shows a structure of a search control unit 120. The search control unit 120 is provided with a search direction determining unit 210, a non-player character (herein after also referred to as a "NPC") determining unit 212, a lock-on processing unit 214 and a lighting control unit 216. The search control unit 120 performs a searching process of searching for a non-player character while button status information indicating that the manipulation button 34 is pressed is transmitted. Therefore, the user can start the searching process by pressing the manipulation button 34 and terminates the searching process by releasing the manipulation button 34 from its pressed state.

The search direction determining unit 210 acquires the attitude information of the input device 20 from the operation instruction receiving unit 102 and determines the direction to search for a non-player character. The searching direction is determined by using the attitude of the input device 20 while setting the position of the player character 200 and the direction of the line of sight of the virtual camera as references in the game space. The reference attitude of the input device 20 is registered in advance before the execution of the game application. For example, an attitude in which the longitudinal direction of the input device 20 is perpendicular to the display is registered in advance as the reference attitude in a real three-dimensional space. By registering a reference attitude of the input device 20 in this manner, the direction of the input device 20 in the real space can be substantially conformed to the direction of the line of sight of the virtual camera in the game space. Therefore, the direction of the input device 20 and the searching direction in the game space can be aligned with each other.

The search direction determining unit 210 detects the attitude of the input device 20 from the detection value information of the three-axis acceleration sensor 56 and the three-axis gyro sensor 58. The attitude of the input device 20 is detected as an amount of change with respect to the reference attitude, and represented by a vector in the real three-dimensional space. The search direction determining unit 210 determines the searching direction at the position of the player character 200 based on the detected attitude of the input device 20 and the direction of the line of sight of the camera in the virtual three-dimensional space of the game world. More specifically, the searching direction is determined by processing the amount of change with respect to the reference attitude as an amount of change with respect to the line-of-sight vector of the camera. The detected attitude of the input device 20 may be used directly as the direction to search for a non-player character in the virtual three-dimensional space of the game world. The NPC determining unit 212 determines whether a non-player character exists in the detected searching direction.

FIG. 8 is a diagram for illustrating a non-player character detecting function of the NPC determining unit 212. Although a virtual two-dimensional space is shown in FIG. 8 for the sake of illustration, the NPC determining unit 212 detects a non-player character actually in the virtual three-dimensional space. The display screen image shown in FIG. 6 is formed by the area clipped by a frame area 220 in the space shown in FIG. 8. In the two-dimensional space shown in FIG. 8, the direction shown with an arrow is the reference direction specified by the reference attitude.

Although in the display screen image shown in FIG. 6, only the non-player character 204 is displayed, in the virtual space shown in FIG. 8, a non-player character 208 exists at the back side of the obstacle 206 and a non-player character 218 exists behind the player character 200. The NPC determining unit 212 is able to detect not only the non-player character 204 that can be seen from the player character 200, but also the non-player characters 208 and 218 that can not be seen from the player character 200.

The NPC determining unit 212 determines whether or not a non-player character exists in the searching direction. For example, the NPC determining unit 212 defines a box (boundary box) surrounding a non-player character existing in the game space, and determines whether or not a non-player character exists by determining whether or not a vector of infinite length, of which the starting point is the position of the player character 200 and which represents the searching direction, intersects with the boundary box. The boundary box may be a virtual spherical body that contains a non-player character at the center. The size of the boundary box to be defined is determined in proportion to the distance from the position of the player character 200. That is, the smaller the distance between the player character 200 and a non-player character is, the smaller the size of the boundary box defined for the non-player character is, and the larger the distance is, the larger the size of the defined boundary box is. This allows the searching direction to have an angle such as a view angle, and the existence of a non-player character can be checked effectively. The NPC determining unit 212 may calculate the distance between the vector of infinite length that represents the searching direction and the non-player character, and may determine that the non-player character exists in case the calculated distance is less than a threshold value, accordingly. The threshold value is defined so as to become large with the increase in distance from the player character 200.

The NPC determining unit 212 may define a virtual cone whose central axis represents the searching direction and whose top is set at the position of the player character 200, and may determine that a non-player character exists if the non-player character is included in the virtual cone.

The NPC determining unit 212 may change a searching range in accordance with the elevation angle of the searching direction in the game space represented in the world coordinates. For example, the NPC determining unit 212 may expand the searching range in case of searching a direction upward from the player character 200 than the searching range for searching along the plane where the player character 200 positioned. In case the input device 20 is tilted in the upward direction with respect to the horizontal plane, the NPC determining unit 212 may expand the searching range by, for example, defining the size of the boundary box larger than that for a horizontal direction, so that a non-player character can be readily found. In this manner, by expanding the searching range, in case that the searching direction is at an angle with respect to the horizontal plane, than the searching range along the horizontal plane, characteristics of the three-dimensional game space, which a two-dimensional space does not have, can be effectively utilized.

The NPC determining unit 212 detects that a non-player character exists, and notifies the lighting control unit 216 thereof, accordingly. Upon receiving the notification, the lighting control unit 216 controls the lighting of the illuminator 22 of the input device 20. More specifically, the lighting control unit 216 generates a light emission instruction that changes the color of light emitted from the illuminator 22, and allows the wireless communication module 86 to transmit the instruction to the input device 20. At normal times, if the illuminator 22 emits light in, for example, blue, the lighting control unit 216 generates an instruction for emitting light in a color other than blue. While a non-player character exists in the searching direction, the NPC determining unit 212 keeps notifying the lighting control unit 216 thereof. During receiving the notification, the lighting control unit 216 allows the wireless communication module 86 to transmit the light emission instruction. For example, the color of emitting light specified by the light emission instruction is defined as red, which calls attention of users. In order to enhance the image recognition accuracy for the illuminator 22, the NPC determining unit 212 may instruct a color different from colors included in the field of view of the imaging device 14 as the color of light to be emitted. For example, the NPC determining unit 212 may select a color having the highest recognition accuracy, more specifically, a color that is not included in a frame image of the imaging device 14 from a plurality of potential colors of light to be emitted, and may generate the light emission instruction, accordingly.

In the input device 20, the wireless communication module 48 receives the light emission instruction, and the main control unit 52 provides the illumination control unit 60 with the instruction, accordingly. The illumination control unit 60 controls the light emission of the illumination unit 62 so that light is emitted in the color specified by the light emission instruction. Thereby, the illumination unit 62 emits light in the color specified by the light emission instruction.

The user watches the change of the color of the illuminator 22, and recognizes that he/she could find a non-player character. In case the user releases the manipulation button 34 from its pressed state, the lock-on processing unit 214 determines that the searching process is terminated and locks on the found non-player character. Here, "lock on" refers to automatic setting of the direction of movement of the player character 200 toward the non-player character so that the player character 200 can chase the locked-on non-player character as far as the user continues manipulating the manipulation button 40, even though the non-player character keeps escaping. If the NPC determining unit 212 determines the non-existence of non-player characters in the searching direction when the manipulation button 34 is released from its pressed state, the lock-on processing unit 214 can not lock on any non-player characters. In case that the searching process determines that a plurality of non-player characters exist in the searching range, the lock-on processing unit 214 may lock on a non-player character positioned at the nearest distance from the player character 200.

The image processing unit 82 receives the instruction for directing the illuminator 22 to emit light from the lighting control unit 216 and constantly keeps track of the color of light emitted from the illuminator 22. Thereby, the image processing unit 82 can redefine the threshold values for respective RGB pixels when performing a digitization process on frame images, in accordance with the color of the light emission. By performing the digitization process on frame images based on the redefined threshold values, the image processing unit 82 can continue the identification of the position and the size of the illuminator image, even the color of light emission is changed.

Figure 9:
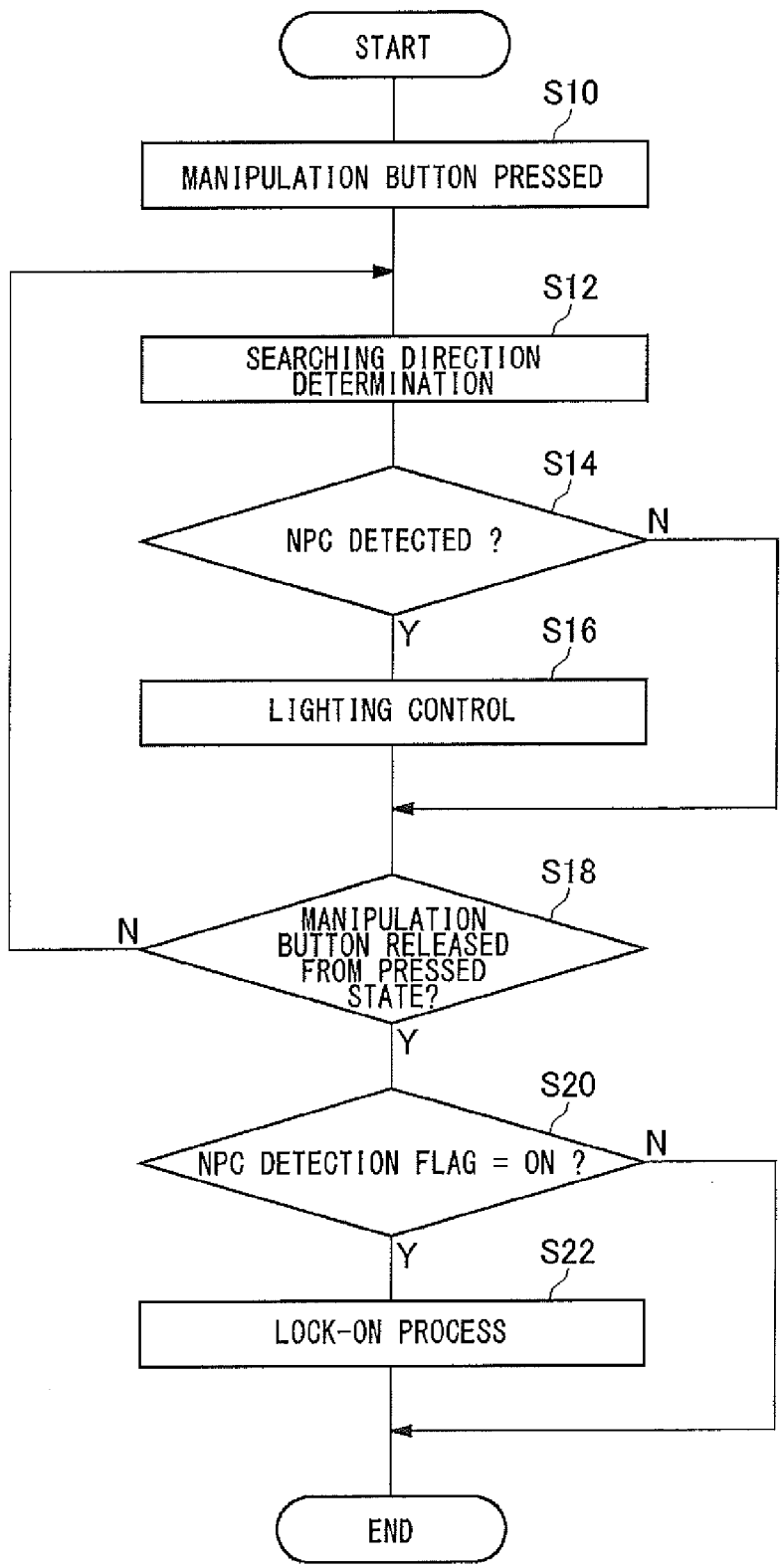
FIG. 9 is a flowchart illustrating processing by the search control unit.

FIG. 9 is a flowchart illustrating processing by the search control unit 120. The operation instruction receiving unit 102 receives the button status information indicating that the manipulation button 34 is pressed (S10), and the search control unit 120 starts a searching process, accordingly. The search direction determining unit 210 determines the direction for searching for a non-player character based on the position of the player character 200 in a virtual three-dimensional space, the attitude information of the input device 20, and the line-of-sight vector of the virtual camera (S12). The NPC determining unit 212 determines whether a non-player character exist in the determined searching direction (S14), and upon detecting a non-player character (Y in S14), the NPC determining unit 212 notifies the lighting control unit 216 of the detection. In this process, the NPC determining unit 212 may set a NPC detection flag as "ON", and may notify the lighting control unit 216 of the flag value. The NPC detection flag has been set as "OFF" if a non-player character is not detected. The lighting control unit 216 receives the flag ON value, and controls the light emission of the illuminator 22 of the input device 20 so as to change the color of light emission (S16). If a non-player character is not detected in the searching direction (N in S14), the color of light emitted from the illuminator 22 does not change. While the operation instruction receiving unit 102 receives button status information indicating that the manipulation button 34 is pressed (N in S18), the process from step S12 to step S16 is performed repeatedly.

The operation instruction receiving unit 102 receives button status information indicating that the manipulation button 34 is released from its pressed state (Y in S18), the lock-on processing unit 214 refers to a NPC detection flag value (S20). If the NPC detection flag value is ON (Y in S 20), the lock-on process is performed on a non-player character whose existence is detected in the searching direction (S22). If the NPC detection flag value is OFF (N in S 20), the lock-on process is not performed. Thus the searching process of the search control unit 120 is completed.

Upon finding a non-player character, the lighting control unit 216 changes the color of light emitted from the illuminator 22 of the input device 20. In this process, the lighting control unit 216 may determines the color of the light emission in accordance with status information of the found non-player character.

The non-operation object control unit 116 determines status information of the non-player character. For example, whether the non-player character recognizes the existence of the player character 200 is set as the status information. The conditions for the non-player character to recognize the existence of the player character 200 are that the player character 200 is included in the view angle of the non-player character, and that the distance between the non-player character and the player character 200 is less than or equal to a predetermined value. The non-operation object control unit 116 checks whether or not the conditions are met for respective non-player characters, and reflects the checking results to status flag values. If the conditions are satisfied, the status flag value is set as ON, and if the conditions are not satisfied, the status flag value is set as OFF. Since the player character 200 and a non-player character move with respect to each other, this status flag value needs to be updated at predetermined time intervals.

Upon detecting the existence of a non-player character in the searching direction, the NPC determining unit 212 acquires the status flag value of the non-player character, and notifies the lighting control unit 216 thereof. The lighting control unit 216 determines the color of light emitted from the illuminator 22 in accordance with the status flag value. Thereby, the user can recognize whether or not the found non-player character recognizes the player character 200 by watching the color of the light emitted from the illuminator 22. Therefore, the user can determine how to chase the non-player character. For example, after locking on a non-player character that recognizes the player character 200, if the player character 200 chases the non-player character in a normal way, the non-operation object control unit 116 may move the non-player character so as to keep escaping at a furious speed. In this case, the player character 200 may chase the non-player character slowly so as to be able to readily capture the non-player character.

In this process, the non-operation object control unit 116 switches motion patterns and controls the motion of the non-player character based on the status flag value defined for the non-player character. As described above, in case the status flag value of a certain non-player character is set ON, upon detecting that the player character 200 approaches to the non-player character at a normal speed, the non-operation object control unit 116 switches the motion patterns and controls the motion of the non-player character so that the non-player character steps away from the player character 200 at high speed. On the other hand, upon detecting that the player character 200 approaches to the non-player character at a speed lower than the normal speed, the non-operation object control unit 116 does not switch the motion patterns and controls the motion of the non-player character with a normal motion pattern.

Although an explanation has been given on status information that specifies whether or not a non-player character recognizes the existence of the player character 200, the NPC determining unit 212 may determine the color of light emission based on other status information. For example, information on distance between a found non-player character and the player character 200 may be set as the status information, or information on the number of non-player characters found in a searching range may be set as the status information. Besides changing the color of light emission in accordance with status information, the NPC determining unit 212 may generate a blinking instruction for repeating the lighting and extinguishing, or may generate multi-color switching instruction for switching among a plurality of colors periodically.

As described above, upon locking on a non-player character, the player character 200 chases the locked on non-player character by manipulation of the manipulation button 40 by a user. This process is performed by the operation object control unit 112. In this process, the item determining unit 114 determines an item that was used before the search radar is used as an item that the player character uses. For example, if a capturing equipment was used before the search radar is used, the capturing equipment is determined as the item after completion of the searching process.

Figure 10:
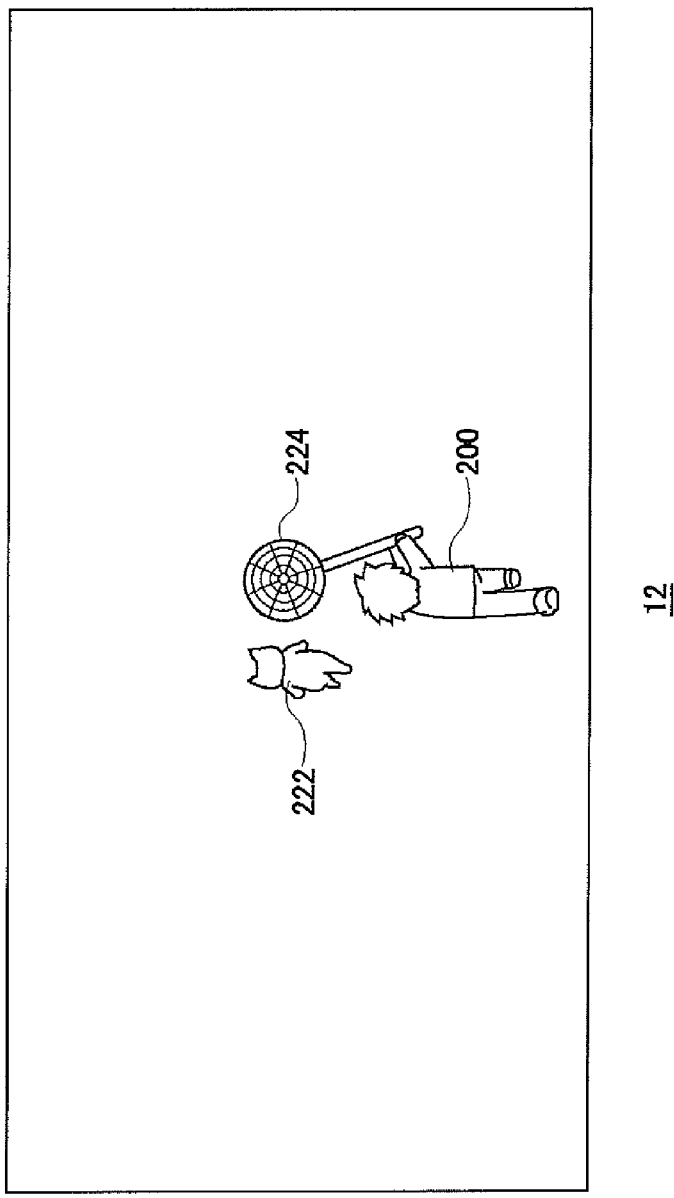
FIG. 10 shows an exemplary display screen image while a capturing equipment is used.

FIG. 10 shows an exemplary display screen image while a capturing equipment is used. On the display image, a player character 200, a non-player character 222 and a capture net 224 are displayed. The capture net 224 is one sort of the capturing equipments. By enclosing the non-player character 222 in the capture net 224 and pushing a ring portion (a net frame) of the net against a floor or a wall, the capturing is completed. Upon completing the capturing, the non-player character 222 vanishes in the capture net 224.

Figure 11A:
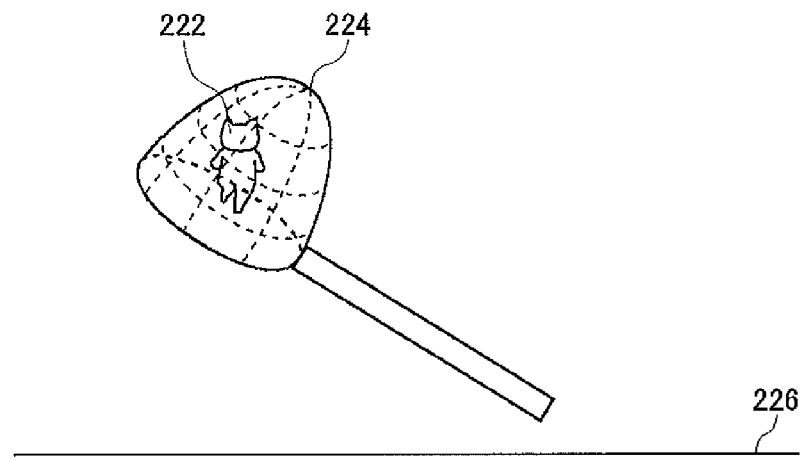
FIGS. 11A and 11B are diagrams for illustrating a process of capturing a non-player character.
Figure 11B:
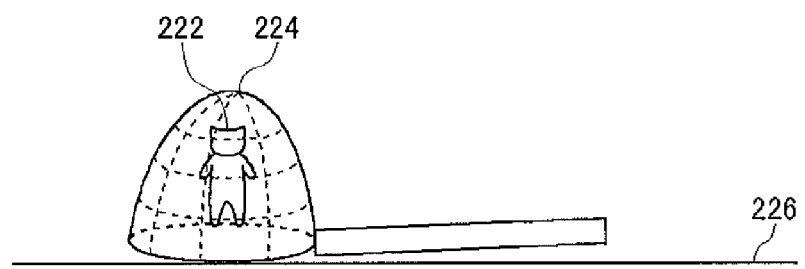

FIGS. 11A and 11B are diagrams for illustrating a process of capturing a non-player character 222. FIG. 11A shows a status where the non-player character 222 is enclosed in the capture net 224. When being left in the capture net 224 for a predetermined time period, the non-player character 222 can escape from the capture net 224. Further, in case the user presses the manipulation button 32 while the non-player character 222 is in the capture net 224, the non-player character 222 can be released from the capture net 224. In this manner, according to the present game application, a variety of ways to enjoy the game is provided to users.

FIG. 11B shows a status where the ring portion of the capture net 224 is pushed against the floor 226. The capturing is completed by pushing the ring portion of the capture net 224 against the floor 226 within a predetermined time period after the non-player character 222 is enclosed in the capture net 224. Then, the non-player character 222 vanishes from inside the capture net 224. An object against which the ring portion is pushed is not limited to the floor 226, but may also be any objects fixed in the game world, such as a wall, or the like.

Figure 12:
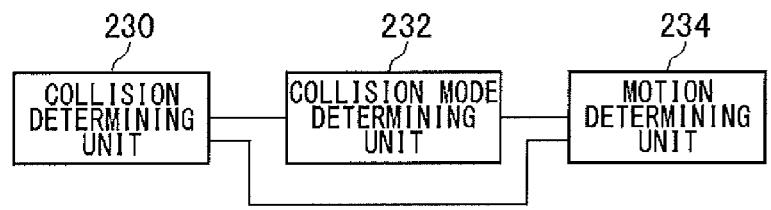
FIG. 12 shows a structure of a collision control unit.

FIG. 12 shows a structure of a collision control unit 118. The collision control unit 118 is provided with a collision determining unit 230, a collision mode determining unit 232, and a motion determining unit 234. The collision control unit 118 performs a collision control on collision between an operation object and a non-operation object. The collision determining unit 230 performs a collision determination on collision between an operation object and a non-operation object. Upon detecting a collision, the collision mode determining unit 232 determines the collision mode. The motion determining unit 234 determines the motion of at least one of the operation object and the non-operation object in accordance with the collision mode.

Based on button status information indicating that the manipulation button 40 is manipulated, the operation object control unit 112 allows the player character 200 to chase the locked on non-player character 222. If the player character 200 approaches to the non-player character 222, the user releases the manipulation button 40 from its pressed state. Thereafter, the operation object control unit 112 controls the motion of the player character 200 and the capture net 224 based on the position information and the attitude information of the input device 20. More specifically, the operation object control unit 112 determines the cross directional movement of the player character 200 based on the distance information derived from the size of the illuminator image in a frame image, and determines the right-left directional movement based on the position coordinates of the illuminator image in a frame image. Yet more specifically, respective movements are determined by the distance information and the difference values from the position coordinates at the time point when the manipulation button 40 is released from its pressed state. Further, the operation object control unit 112 determines the movement of the capture net 224 based on the attitude information. The user moves the input device 20 as if it is a net, the operation object control unit 112 controls the movement of the capture net 224 in a similar manner with the movement of the input device 20 caused by the user. Thereby, the movement of the user and the movement of the player character 200 can be synchronized with each other.

The collision determining unit 230 performs a collision determination on a collision between the capture net 224 and the non-player character 222. The collision determining unit 230 performs a collision determination, by using a known algorithm of the collision determination, on a collision between a plane formed inward of the ring portion of the capture net 224 and the non-player character 222. Upon the detection of the collision, the collision mode determining unit 232 determines a collision mode for the collision.

The operation object control unit 112 derives the movement velocity of the capture net 224 from sensor detection value information transmitted from the input device 20, and moves the capture net 224, accordingly. In this manner, the operation object control unit 112 may detect the movement velocity of the capture net 224 by using the detection value information of the acceleration sensor. The operation object control unit 112 may derive the movement velocity of the capture net 224 from the position information of the input device 20 for each frame derived by the device information deriving unit 84. The collision determining unit 230 determines a collision between the plane formed at the ring portion of the capture net 224 and the non-player character 222, and the collision mode determining unit 232 acquires the movement velocity of the capture net 224, accordingly. In this process, the collision mode determining unit 232 determines whether or not the movement velocity of the capture net 224 is less than or equal to a predetermined velocity, in accordance with the determination determines the collision mode, and notifies the motion determining unit 234 thereof.

In case the determined collision mode indicates that the movement velocity of the capture net 224 is less than or equal to the predetermined velocity, the motion determining unit 234 determines the motion of the non-player character 222 so as not to be able to escape from the capture net 224 for a predetermined time period. This determined motion is notified to the non-operation object control unit 116. Upon receiving the notification, the non-operation object control unit 116 controls the non-player character 222 so as to move within the capture net 224 for the predetermined time period. On the other hand, in case that the determined collision mode indicates that the movement velocity of the capture net 224 is more than the predetermined velocity, the motion determining unit 234 determines the motion of the non-player character 222 so as to vanish right after entering the capture net 224. This determined motion is notified to the non-operation object control unit 116. Upon receiving the notification, the non-operation object control unit 116 controls the non-player character 222 so as vanish right after entering into the capture net 224.

In this manner, by determining the collision mode in accordance with the sensor detection value information and/or the position information of the input device 20, and by determining the motion of the non-player character 222 based on the collision mode, a game that takes advantage of the characteristics of the input device 20 can be implemented. The motion of the player character 200 may be determined based on the collision mode. Although the collision mode is determined based on the movement velocity in the exemplary embodiment, the collision mode may be determined based on the acceleration, alternatively.

In case that the motion of the non-player character 222 is determined so that the non-player character 222 remains in the capture net 224 for a predetermined time period, the non-player character 222 can be vanished by allowing the player character 200 to push the capture net 224 against a floor or a wall. The collision determining unit 230 performs a collision determination on collision between the ring portion of the capture net 224 and a floor or a wall. In case a collision is detected, the collision mode determining unit 232 determines the collision mode in accordance with an angle between a plane formed at the ring portion and a floor plane. An angle between planes is acquired from an angle between the normals of respective planes. The collision mode determining unit 232 determines whether or not the angle between planes are more than or equal to a predetermined angle, and according to the determination result, determines the collision mode, and notifies the motion determining unit 234 thereof.

Although the collision mode may be determined by the collision determination, the collision mode may also be determined based on the positional relationship between the world coordinates of the floor or the wall and the world coordinates of the ring portion of the capture net 224 in the game space.

In case the determined collision mode indicates that the angle between the planes is more than or equal to the predetermined value, the motion determining unit 234 determines the motion of the non-player character 222 so as to be able to escape from the capture net 224. The determined motion is notified to the non-operation object control unit 116. Upon receiving the notification, the non-operation object control unit 116 controls the non-player character 222 so as to escape from the capture net 224 after a predetermined time is elapsed from the time when the non-player character 222 enters the capture net 224. On the other hand, in case the determined collision mode indicates that the angle between the planes is smaller than the predetermined value, the motion determining unit 234 determines the motion of the non-player character 222 so as to vanish. The determined motion is notified to the non-operation object control unit 116. Upon receiving the notification, the non-operation object control unit 116 controls the non-player character 222 in the capture net 224 so as to vanish.

If the user manipulates the manipulation button 40 of the input device 20 while the non-player character 222 is trapped in the capture net 224, the non-operation object control unit 116 releases the non-player character 222 in the direction perpendicular to the plane formed at the ring portion of the capture net 224 based on the attitude information of the input device 20. In this manner, the present game application can provide a wide variety of motions for the non-player character 222 in accordance with the collision mode of a collision between the capture net 224 and non-player character 222.

Figure 13:
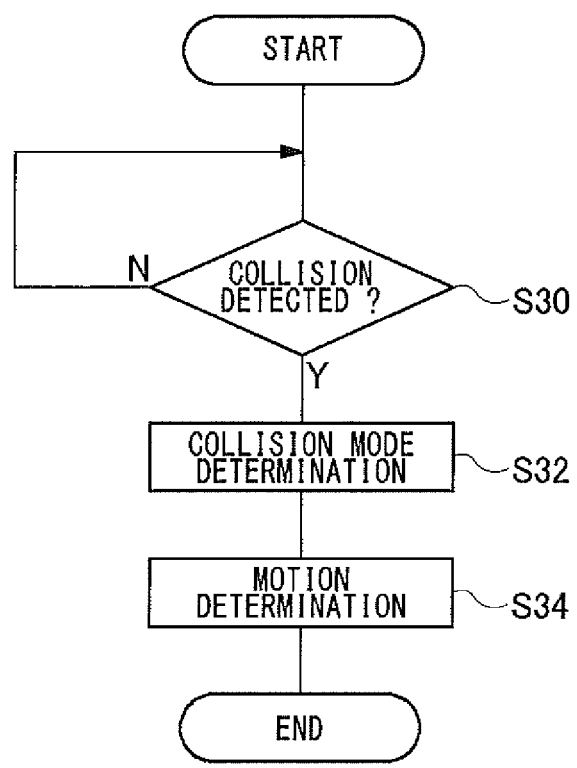
FIG. 13 is a flowchart illustrating processing by the collision control unit.

FIG. 13 is a flowchart illustrating processing by the collision control unit 118. The collision determining unit 230 performs a collision determination on collision between an operation object and a non-operation object (S30). If collision is not detected (N in S30), this collision control process does not proceed. If a collision is detected (Y in S30), the collision mode determining unit 232 determines the collision mode (S32). The motion determining unit 234 determines the motion of at least one of the operation object and the non-operation object in accordance with the collision mode (S34).

In the present game, although the capturing equipment is set as a default item and the capturing equipment is always determined as an item after the searching process ends, a user can change the item used by the player character 200 by pressing the manipulation button 36. The item determining unit 114 determines a bashing weapon as an item to be used by the player character.

"Harisen" is one sort of bashing weapons. Actual harisen is accordion folded paper, one end thereof being formed into a grip by winding a tape or the like around the end, and the other end being opened like a fan. The player character 200 can hit a non-player character by using a harisen. The direction of the harisen is determined based on the attitude information of the input device 20. The collision determining unit 230 performs a collision determination between the harisen and a non-player character.

The operation object control unit 112 derives the movement velocity of the harisen based on the sensor detection value information transmitted from the input device 20, and moves the harisen, accordingly. The collision determining unit 230 determines a collision between the harisen and a non-player character, and the motion determining unit 234 determines the direction in which the non-player character 222 is blown out and the velocity thereof based on the movement direction and the movement velocity of the harisen at the time of the collision. The determined motion is notified to the non-operation object control unit 116. Upon receiving the notification, the non-operation object control unit 116 allows the non-player character 222 to move in accordance with the motion.

Although the harisen is used as a bashing weapon, the harisen may also be used as a fan by using its accordion portion in order to make a wind. The operation object control unit 112 determines the direction in which to move the harisen based on the attitude information of the input device 20 and allows the harisen to move either as a bashing weapon or as a fan.

Figure 14A:
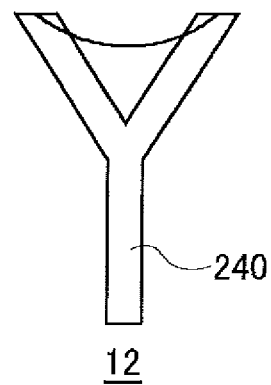
FIG. 14A to 14C show exemplary display screen images of a sling shot.

Alternatively, if the user presses the manipulation button 36, the item determining unit 114 may determine a throwing weapon as an item to be used by the player character, accordingly. FIG. 14A shows an exemplary display screen image of a sling shot, which is one sort of throwing weapons. The user manipulates the manipulation button 40, and the operation object control unit 112 allows the player character 200 to hold a sling shot 240. In the figures, the player character 200 is not shown. The operation object control unit 112 acquires the position information and the attitude information of the input device 20 at the time when the manipulation button 40 is manipulated as initial state information. The operation object control unit 112 determines the direction of the sling shot 240 based on the attitude information.

Figure 14B:
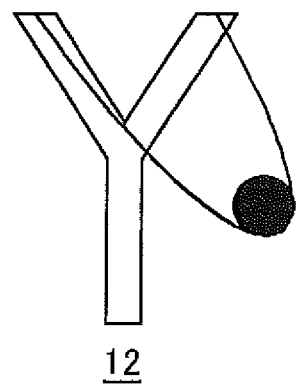
Figure 14C:
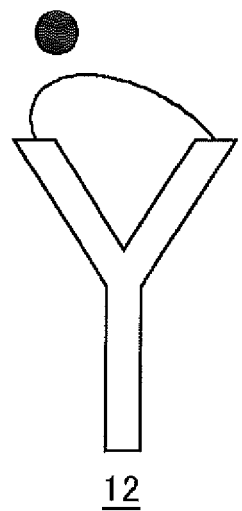

FIG. 14B shows an exemplary display screen image at the time when the input device 20 is moved in the direction that takes the device far from the imaging device 14. In this example, the elastic string is pulled back in accordance with an amount of the movement from the position at the time when the manipulation button 40 is manipulated. A bullet is set to the elastic string and if the manipulation button 40 is released from its pressed state, the bullet is thrown as shown in FIG. 14C. The operation object control unit 112 may determine the flying distance of the bullet in accordance with the amount of displacement from the initial position, and/or a time period while the manipulation button 40 is being pressed.

Items provided in the present game are indicated below.

1) a tong

A user presses the manipulation button 30 and the manipulation button 40 at the same time, and the player character 200 can grasp a non-operation object by using the tong, accordingly.

2) a ladle

The player character 200 can scoop cold water or hot water by the ladle and can splash a non-player character with the water. The non-operation object control unit 116 changes the motion of the non-player character based on the temperature of the water.

Other items that take advantage of the characteristic of the input device 20 may also be provided.

Given above is an explanation based on the exemplary embodiments. These embodiments are intended to be illustrative only and it will be obvious to those skilled in the art that various modifications to constituting elements and processes could be developed and that such modifications are also within the scope of the present invention.

EXPLANATION OF THE REFERENCE NUMERALS

1 . . . game system, 10 . . . game device, 12 . . . display device, 14 . . . imaging device, 20 . . . input device, 22 . . . illuminator, 24 handle, 48 . . . wireless communication module, 50 . . . processing unit, 52 . . . main control unit, 54 . . . input receiving unit, 56 . . . three-axis acceleration sensor, 58 . . . three-axis gyro sensor, 60 . . . illumination control unit, 62 . . . illumination unit, 80 . . . frame image acquiring unit, 82 . . . image processing unit, 84 . . . device information deriving unit, 86 . . . wireless communication module, 88 . . . input receiving unit, 90 . . . output unit, 100 . . . application processing unit, 102 . . . operation instruction receiving unit 110 control unit, 112 . . . operation object control unit, 114 . . . item determining unit, 116 . . . non-operation object control unit, 118 . . . collision control unit, 120 . . . search control unit, 122 . . . display control unit, 150 . . . parameter retaining unit, 152 . . . three-dimensional data retaining unit, 154 . . . image generating unit, 210 . . . search direction determining unit, 212 . . . NPC determining unit, 214 . . . lock-on processing unit, 216 . . . lighting control unit, 230 . . . collision determining unit, 232 . . . collision mode determining unit, 234 . . . motion determining unit.

The present invention can be applied to the field of gaming.

The invention claimed is:

1. A game device, comprising:
an image acquiring unit operative to acquire a captured image of an input device that is provided with a handle having at least one manipulation button and an illuminator having an outer spherical body;
a device information deriving unit operative to derive position information of the input device based on a position and a size of the illuminator within the captured image, where the device information deriving unit derives the position information including position coordinates and distance information, the position coordinates are derived based on the position of the illuminator within the captured image, and the distance information is derived based on the size of the illuminator within the captured image;
a receiving unit operative to acquire attitude information of the input device and status information regarding a user's manipulation of the at least one manipulation button;
an operation object control unit operative to control the motion of an operation object in accordance with the position information and the attitude information of the input device;
a non-operation object control unit operative to control the motion of a non-operation object;
an image generating unit operative to generate a display screen image in accordance with the motion of the operation object and the motion of the non-operation object; and
a collision control unit operative to detect a collision between the operation object and the non-operation object, where the collision control unit determines the motion of the non-operation object in accordance with a collision mode for the collision between the operation object and the non-operation object,
wherein the non-operation object control unit controls the motion of the non-operation object to move in accordance with the motion determined by the collision control unit and in accordance with the status information regarding the at least one manipulation button, where the status information includes information as to the user's desired motion of the operational object that effects: (i) the motion of the operational object, (ii) whether the collision control unit determines that the motion of the operational object and the motion of the non-operation object result in the collision between the operation object and the non-operation object, and (iii) the collision mode.

2. The game device according to claim 1, wherein the collision control unit determines the collision mode based on the motion of the operation object at the time of the collision.

3. The game device according to claim 1, wherein the collision control unit determines the collision mode based on the velocity or the acceleration of the operation object at the time of the collision.

4. The game device of claim 1, further comprising:
a searching direction determining unit operative to determine a direction for searching for the non-operation object based on the position of the operation object and attitude information of the input device;
a determining unit operative to determine whether the non-operation object exists in the searching direction, and to acquire, upon determining that a non-operation object exists, status information of the non-operation object, wherein the status information of the non-operation object represents whether one or more characteristics of the operation object relative to the non-operation object meet one or more conditions; and
a lighting control unit operative to control the lighting of the illuminator if the determining unit determines that a non-operation object exists and based on whether the one or more conditions are met.

5. The game device according to claim 4, wherein the one or more characteristics and conditions include at least one of: (i) whether the operation object is within a view angle of the non-operation object; and (ii) whether a distance between the operation object and the non-operation object is less than or equal to a predetermined threshold.

6. A non-transitory computer-readable recording medium containing a computer program, which when executed on a processing device causes the processing device to exhibit functional modules, comprising:
a module operative to acquire a captured image of an input device that is provided with a handle having at least one manipulation button and an illuminator having an outer spherical body;
a module operative to derive position information of the input device based on a position and a size of the illuminator within the captured image, where the device information deriving unit derives the position information including position coordinates and distance information, the position coordinates are derived based on the position of the illuminator within the captured image, and the distance information is derived based on the size of the illuminator within the captured image;
a module operative to acquire attitude information of the input device and status information regarding a user's manipulation of the at least one manipulation button;

a module operative to control the motion of an operation object in accordance with the position information and the attitude information of the input device;

a module operative to control the motion of a non-operation object;

a module operative to generate a display screen image in accordance with the motion of the operation object and the motion of the non-operation object;

a module operative to detect a collision between the operation object and the non-operation object;

a module operative to determine a collision mode for the collision between the operation object and the non-operation object; and a module operative to determine the motion of the non-operation object in accordance with the collision mode, wherein the module operative to control the non-operation object controls the motion of the non-operation object to move in accordance with the motion determined by the module operative to determine the motion of the non-operation object in accordance with the collision mode and in accordance with the status information regarding the at least one manipulation button, where the status information includes information as to the user's desired motion of the operational object that effects: (i) the motion of the operational object, (ii) whether the collision control unit determines that the motion of the operational object and the motion of the non-operation object result in the collision between the operation object and the non-operation object, and (iii) the collision mode.

7. The non-transitory computer-readable recording medium of claim 6, further comprising:

a module operative to determine a direction for searching for the non-operation object based on the position of the operation object and attitude information of the input device;

a module operative to determine whether the non-operation object exists in the searching direction, and operative to acquire, upon determining that a non-operation object exists, status information of the non-operation object, wherein the status information of the non-operation object represents whether one or more characteristics of the operation object relative to the non-operation object meet one or more conditions; and a module operative to control the lighting of the illuminator if it is determined that a non-operation object exists and based on whether the one or more conditions are met.

8. The non-transitory computer-readable recording medium of claim 7, wherein the one or more characteristics and conditions include at least one of: (i) whether the operation object is within a view angle of the non-operation object; and (ii) whether a distance between the operation object and the non-operation object is less than or equal to a predetermined threshold.

* * * * *